Patented Nov. 3, 1942

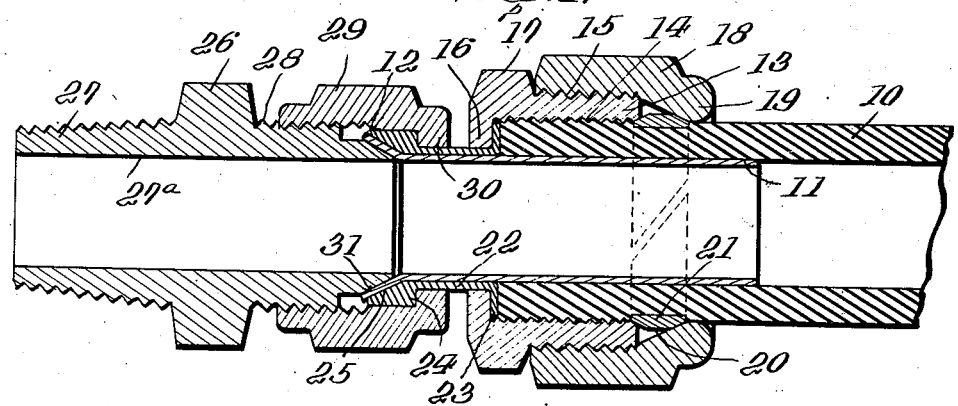
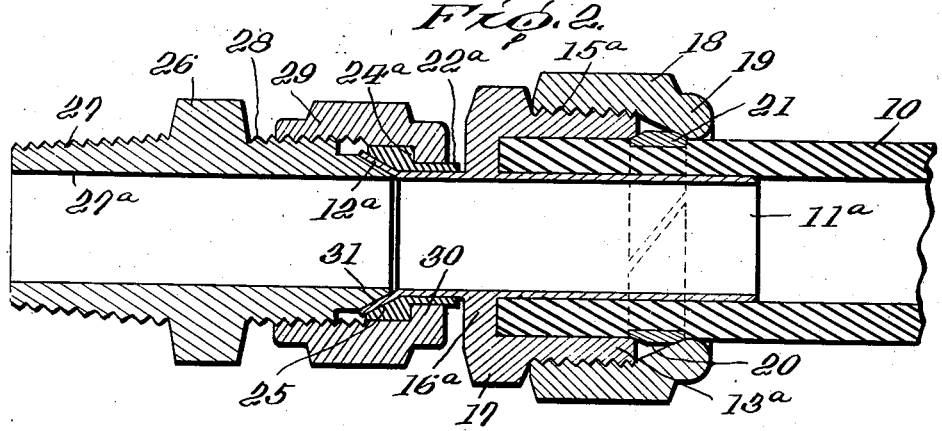
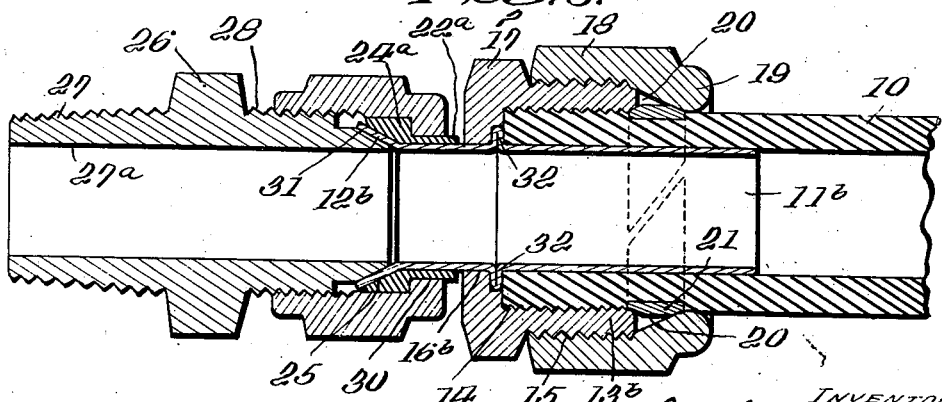

2,300,464

UNITED STATES PATENT OFFICE 2,300,464

HOSE COUPLING

Arthur L. Parker, Cleveland, Ohio

Application December 28, 1940, Serial No. 372,158

5 Claims. (Cl. 285—122)

The present invention relates to new and useful improvements in couplings for joining fluid conduits, and more particularly to improvements in a coupling for connecting hose sections to various types of conduits.

According to the present invention, the coupling generally includes a clamping assembly for one end of the hose section. This clamping assembly has associated therewith an inner tubular portion on which the end of the hose section is placed and against which the hose is clamped. This tubular portion extends beyond the clamping assembly and is adapted to be clamped in communication with a suitable conduit so that communication between the hose section and the conduit is afforded through the tubular portion.

An object of the present invention is to provide a coupling of the above type which is constructed and arranged so that the hose section can be quickly connected to a conduit without twisting either the conduit or the hose section.

A further object of the invention is to provide a coupling of the above type wherein a tubular member affording communication between the hose section and the connected conduit is adapted to be clamped in communication with the conduit by means which eliminates the necessity of twisting either the conduit or the hose section.

A still further object of the invention is to provide a coupling of the above type which is simple in construction and which affords fluid tight communication with a minimum number of parts.

The above and other objects of the invention will in part be obvious and will be hereinafter more fully pointed out.

In the accompanying drawing:

Figure 1 is a longitudinal section showing one form of coupling with the hose section secured in communication with a conduit.

Figure 2 is a similar longitudinal section showing a modified form of coupling.

Figure 3 is a similar longitudinal section showing a still further modification.

Referring more in detail to the accompanying drawing, and particularly to Figure 1, one end of a flexible hose 10 is placed over one end of a tubular member 11, the opposite end of which extends beyond the end of the hose and is provided with an outwardly flared end portion 12. A sleeve member 13 is disposed around the end of the hose 10 and is provided with internal and external threads 14, 15, respectively, and with an inwardly extending radial shoulder portion 16 which is disposed across the adjacent end of the hose. The sleeve member 13 may also be provided with a wrench engaging portion 17.

A clamping member in the form of a sleeve 18 is threadedly connected to the outer threads 15 on the sleeve member 13 and is provided at the free end thereof with an inwardly directed portion 19 having an inclined inner camming surface 20. When the sleeve members 13, 18 are tightened relative to one another, the camming surface 20 is adapted to engage one edge of a split clamping ring 21, the opposite edge of which abuts against the end of the sleeve member 13. Thus, tightening of the sleeve members 13, 18 will effect a tight clamping of the hose against the tubular member 11 by the clamping ring 21 but clamping movement of the sleeve 18 is limited so as to prevent excessive contraction of the ring 21 and resultant damage to the hose. The inner threads 14 on the sleeve member 13 are for the purpose of providing an additional gripping surface between the clamping assembly and the hose in that compression of the hose by the clamping ring 21 will tend to force the hose material into engagement with the threads 14.

A sleeve 22 surrounds the tubular member 11 and is provided at one end thereof with an outwardly directed flange 23 which is disposed between the inner end of the hose 10 and the inner surface of the shoulder 16 on the sleeve member 13. The opposite end of the sleeve 22 is provided with an outwardly directed head or shoulder portion 24 which is provided with a tapered inner surface 25 substantially corresponding in shape to the tapered or flared end 12 of the tubular member 11. A conduit adapter 26 is centrally bored to provide a passage 27a which is in communication with the tubular member 11 and with the hose section 10. The adapter 26 may be provided with external threads 27 for connection with a suitable fluid conduit. The adapter 26 is also provided with external threads 28 which are adapted to threadedly engage internal threads on a clamping nut member 29. The nut member 29 is provided with an inwardly directed shoulder 30 which is adapted to engage the shoulder or head portion 24 on the sleeve 22. The adjacent end of the adapter 26 is provided with an inclined clamping surface 31 against which the inner surface of the flared end 12 of the tubular member 11 is adapted to be clamped when the nut member 29 is tightened relative to the adapter 26.

From the above description, it will be seen that the coupling is one which is adapted to firmly clamp the end of a flexible hose 10 which extends over a tubular member 11. This tubular member provides for fluid tight communication between the hose 10 and another fluid conduit which may be connected to the adapter 26. When the end of the hose 10 is clamped against the tubular member 11, the flared end 12 of the tubular member may then be clamped between the tapered surfaces on the sleeve 22 and the adapter 26 by tightening the nut 29 relative to the adapter. There is a metal to metal contact between the shoulders 24 and 30 so that the nut 29 can be tightened without turning or twisting of the hose 10 or the adapter 26. The flange 23 on the sleeve 22, being disposed within the shoulder 16 on the sleeve member 13, serves to prevent separation of the clamping assembly for the hose section and also the clamping assembly for the end of the tubular member 11.

In the modified form of the invention shown in Figure 2, the tubular member 11a is formed integral with the inwardly directed shoulder 16a on the sleeve member 13a. The sleeve member 18 threadedly engages the outer threads 15a on the sleeve member 13a and the inner threads on the sleeve member 13a are omitted in this form of the invention. Tightening of the sleeve members 18, 13a relative to one another will effect clamping of the hose between the clamping ring 21 and the adjacent portion of the tubular member 11a. Since the tubular portion 11a is formed integral with the shoulder 16a, the intermediate sleeve 22a terminates short of the shoulder 16a but is provided with the head or shoulder portion 24a which is clamped by the shoulder 30 on the nut 29, as described in connection with the form of the invention shown in Figure 1. The flared end 12a of the tubular member 11a is clamped between the inclined surfaces at the end of the adapter 26 and the head member 24a.

In the form of the invention shown in Figure 3, the tubular member 11b is shaped intermediate the ends thereof to provide an outwardly extending annular flange 32 which is disposed between the inner end of the hose 10 and the shoulder 16b on the sleeve member 13b. The flared end 12b of the tubular member 11b is clamped between the inclined surfaces on the adapter and on the head portion 24a, as described in connection with Figure 2. The tubular member 11b is separate from the sleeve member 13b but the flange 32 and the clamped end 12b serve to prevent separation of the hose from the conduit which may be secured to the adapter 26.

From the foregoing description, it will be seen that the present invention provides a highly efficient coupling for clamping a flexible hose section to another fluid conduit. The clamping means for the end of the flexible hose includes a tubular portion which may be integral with the clamping means or separate therefrom. The hose is clamped against the outer surface of the tubular portion which provides fluid communication between the hose and an adapter which may be connected to another fluid conduit. One end of the tubular portion extends outside of the hose clamping means and is clamped in engagement with the conduit adapter. The clamping means for the hose and the clamping means for the outwardly extending end of the tubular portion are prevented from separating in the various ways illustrated. The clamping nut for clamping the flared end of the tubular portion is movable relative to the intermediate sleeve and the tubular portion so that the hose and the adapter can be connected without twisting the hose.

It is to be clearly understood that minor changes in the details of construction and arrangement of parts may be made without departing from the scope of the invention as set forth in the appended claims.

I claim:

1. A coupling for joining a hose section to a fluid conduit comprising a sleeve member within which the end of the hose section is inserted, said sleeve member having an inwardly directed portion adjacent the inner end of the hose section, a tubular member within the hose section against which the hose section is adapted to be clamped, said tubular member extending outwardly beyond the inwardly directed portion of the sleeve member and the hose section and having an outwardly flared end, means including a split ring cooperating with said sleeve member for clamping the hose section against the tubular portion, a clamping sleeve surrounding the flared end of the tubular portion and having a tapered clamping surface engaging the outer face of the flared end of the tubular portion, the inner face of the flared end of the tubular portion being adapted to abut against a tapered clamping surface on the fluid conduit to which the hose is attached and a clamping nut engaging said fluid conduit and having an inwardly directed shoulder engaging the shoulder on the clamping sleeve for clamping the flared end of the tubular portion between said clamping surfaces.

2. A coupling for joining a hose section to another fluid conduit, comprising a sleeve member within which the end of the hose section is adapted to be inserted and said sleeve member having an inwardly directed flange adjacent the inner end of the hose section, means providing a tubular portion disposed within said flange and extending within the hose section and against which the hose section is adapted to be clamped, said tubular portion extending outwardly beyond the flange and the hose section and having an outwardly flared end, means cooperating with said sleeve member for clamping the hose section, a clamping sleeve surrounding the outer surface of the flared end of said tubular portion and having a tapered clamping surface engaging the outer surface of the flared end of the tubular portion and having at the opposite end thereof an outwardly directed shoulder, the inner surface of the flared end of said tubular portion being adapted to abut against a tapered clamping surface on the other fluid conduit, and a clamping nut engaging the said other fluid conduit and having an inwardly directed shoulder engaging the shoulder on said clamping sleeve for clamping the flared end of the tubular portion between said clamping surfaces and the engagement between said shoulders serving to prevent turning or twisting of the hose section during clamping of the flared end of the tubular portion.

3. A coupling for joining a hose section to another fluid conduit, comprising a sleeve member within which the end of the hose section is adapted to be clamped and said sleeve member having an inwardly directed flange adjacent the inner end of the hose section, means providing a tubular portion integral with the flange on said sleeve member and extending within the hose section, said tubular portion extending beyond the end of the hose section and the flange and having an outwardly flared end, a clamping sleeve surrounding the outer surface of the flared end of said tubular portion and having a tapered clamping surface engaging the outer surface of the flared end of the tubular portion and having at the opposite end thereof an outwardly directed shoulder, the inner surface of the flared end of said tubular portion being adapted to abut against a tapered clamping surface on the other fluid conduit, and a clamping nut engaging the said other fluid conduit and having an inwardly directed shoulder engaging the shoulder on said clamping sleeve for clamping the flared end of the tubular portion between said clamping surfaces and the engagement between said shoulders serving to prevent turning or twisting of the hose section during clamping of the flared end of the tubular portion.

4. A coupling for joining a hose section to another fluid conduit, comprising a sleeve member within which the end of the hose member is adapted to be clamped and said sleeve member having an inwardly directed flange adjacent the inner end of the hose section, means providing a tubular portion within said flange and extending within the hose section, said tubular portion extending beyond the flange and the hose section and having an outwardly flared end, said tubular portion being folded upon itself to provide an annular ring extending outwardly and disposed between said flange and the end of the hose section, a clamping sleeve surrounding the outer surface of the flared end of said tubular portion and having a tapered clamping surface engaging the outer surface of the flared end of the tubular portion and having at the opposite end thereof an outwardly directed shoulder, the inner surface of the flared end of said tubular portion being adapted to abut against a tapered clamping surface on the other fluid conduit, and a clamping nut engaging the said other fluid conduit and having an inwardly directed shoulder engaging the shoulder on said clamping sleeve for clamping the flared end of the tubular portion between said clamping surfaces and the engagement between said shoulders serving to prevent turning or twisting of the hose section during clamping of the flared end of the tubular portion.

5. A coupling for joining a hose section to another fluid conduit, comprising a sleeve member within which the end of the hose section is adapted to be clamped, said sleeve member having an inwardly directed flange adjacent the inner end of the hose section, an independent tubular member located within said flange and extending within the end of the hose section, said tubular member extending outwardly beyond the flange and the hose section and having an outwardly flared end, a clamping sleeve surrounding the outer surface of the flared end of said tubular member and having at one end thereof a tapered clamping surface engaging the outer surface of the flared end of the tubular member and having at the opposite end thereof an outwardly directed shoulder disposed between the end of the hose section and the flange on said sleeve member, said clamping sleeve having an outwardly directed shoulder located intermediate the ends thereof, the inner surface of the flared end of said tubular member being adapted to abut against a tapered clamping surface on the other fluid conduit, and a clamping nut engaging the said other fluid conduit and having an inwardly directed shoulder engaging the intermediate shoulder on said clamping sleeve for clamping the flared end of the tubular member between said clamping surfaces and the engagement between the intermediate shoulder on said clamping sleeve and the shoulder on said clamping nut serving to prevent turning or twisting of the hose section during clamping of the flared end of the tubular member.

ARTHUR L. PARKER.